United States Patent

Ueki et al.

[11] Patent Number: 5,529,595
[45] Date of Patent: Jun. 25, 1996

[54] METHOD OF POSITIONING ELEMENTS OF AN OPTICAL INTEGRATED CIRCUIT

[75] Inventors: Ken Ueki; Takeo Shimizu; Isao Ohyama; Shiro Nakamura; Hisaharu Yanagawa, all of Tokyo, Japan

[73] Assignee: The Furukawa Electric Co., Ltd., Tokyo, Japan

[21] Appl. No.: 441,602

[22] Filed: May 15, 1995

Related U.S. Application Data

[63] Continuation of Ser. No. 64,413, May 19, 1993, abandoned.

[30] Foreign Application Priority Data

May 20, 1992 [JP] Japan ..................................... 4-127537

[51] Int. Cl.$^6$ ..................................................... C03B 19/14
[52] U.S. Cl. .................... 65/377; 65/386; 65/608; 356/401; 437/924; 148/DIG. 102
[58] Field of Search ........................... 65/386, 60.8, 377; 356/401; 437/924; 148/DIG. 102

[56] References Cited

U.S. PATENT DOCUMENTS

| | | | |
|---|---|---|---|
| 3,713,911 | 1/1973 | Larkin | 437/924 |
| 3,783,044 | 4/1971 | Cheskis | 437/924 |
| 3,796,497 | 3/1974 | Mathisen | 437/924 |
| 3,808,527 | 4/1974 | Thomas | 437/924 |
| 4,233,091 | 11/1980 | Kawabe | 437/924 |
| 4,740,986 | 4/1988 | Reeder | 372/92 |
| 4,981,529 | 1/1991 | Isujita | 437/924 |
| 5,133,603 | 7/1992 | Suzuki | 437/924 |
| 5,283,205 | 2/1994 | Sakamoto | 437/924 |
| 5,407,763 | 4/1995 | Pai | 356/401 |

FOREIGN PATENT DOCUMENTS

| | | |
|---|---|---|
| 0313681A1 | 10/1987 | European Pat. Off. . |
| 0394866A2 | 4/1990 | European Pat. Off. . |
| 42828 | 3/1985 | Japan ................ 148/DIG. 102 |

*Primary Examiner*—John M. Hoffmann
*Attorney, Agent, or Firm*—John P. White

[57] ABSTRACT

The present invention provides a method of manufacturing an optical component, having the steps of forming a first position aligning pattern on a surface of a substrate, forming a second position aligning recess-projection pattern conforming with the first position aligning pattern and a third position aligning recess-projection pattern having a predetermined positional relationship with the second position aligning recess-projection pattern, and applying a predetermined processing with the third position aligning recess-projection pattern used as a reference under a predetermined positional relationship with the first position aligning pattern.

8 Claims, 1 Drawing Sheet

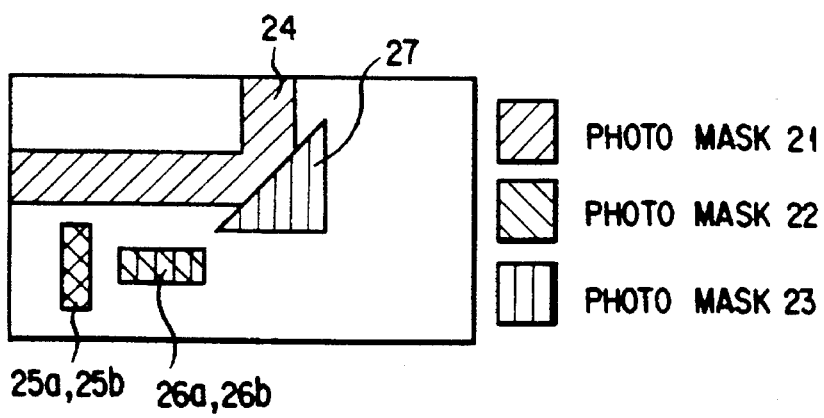
F I G. 3
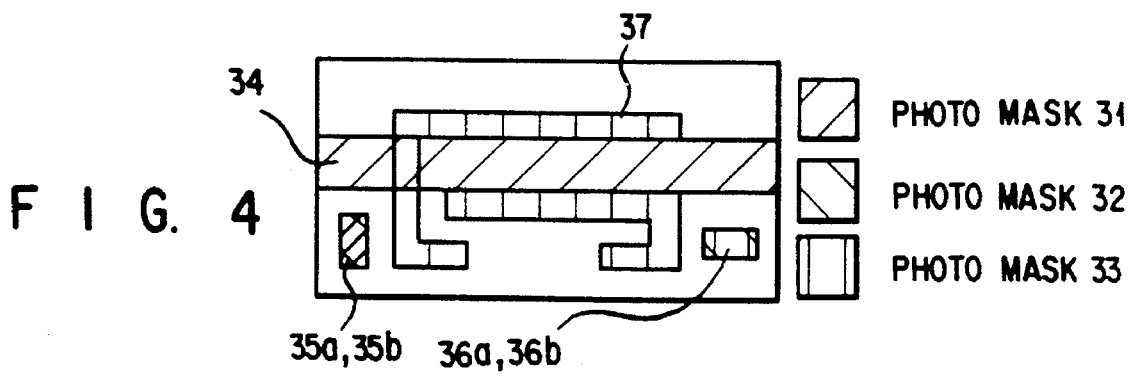
F I G. 4

1

METHOD OF POSITIONING ELEMENTS OF AN OPTICAL INTEGRATED CIRCUIT

This application is a continuation application of U.S. Ser. No. 08/064,413 filed May 19, 1993 now abandoned.

BACKGROUND OF THE INVENTION

1. Field of the Invention

The present invention relates to a method of manufacturing an optical component, particularly, to a method of manufacturing a waveguide type optical component used in the field of an optical communication.

2. Description of the Related Art

In general, a waveguide type optical component is considered to play a vital role in the future in the field of an optical communication. In particular, a waveguide type optical component using a silica-based material exhibits an excellent compatibility with an optical fiber and, thus, is expected to create a big demand.

A folding or bending type optical waveguide having a mirror housed therein as shown in FIGS. 1 and 2 is known to the art as a waveguide type optical component using a silica-based material. Specifically, FIG. 1 is a plan view showing the folding or bending type optical waveguide noted above, with FIG. 2 showing a cross section along the line 2—2 shown in FIG. 1. A folding or bending type optical waveguide of this type is manufactured as follows.

In the first step, a lower cladding layer 12 consisting of a silica-based material and a core layer consisting of a silica-based material containing germanium are formed on a silicon substrate 11 by means of, for example, a flame hydrolysis deposition method, a vacuum evaporation method, a plasma CVD method or a sol-gel method. The lower cladding layer 12 is formed in a thickness of about 20 µm. On the other hand, the core layer is formed in a thickness of about 8 µm. In this case, the refractive index difference between the lower cladding layer 12 and the core layer can be set at, for example, about 0.25%.

In the next step, the core layer is patterned by, for example, a photolithography method with a reactive ion etching method to form a predetermined waveguide core 13 having a pattern width of about 8 µm. After the patterning step, an upper cladding layer 14 is formed in a thickness of about 20 µm as in the formation of the lower cladding layer 12, with the result that the waveguide core 13 is covered with the upper cladding layer 14.

Further, a groove having a depth of about 35 µm and defined by a wall perpendicular to the substrate surface is formed by means of a photolithography method with a reactive ion etching method, followed by depositing a metallic material such as gold having a thickness of about 0.1 µm on the vertical wall surface of the groove by means of, for example, a vacuum evaporation method or a sputtering method so as to form a mirror 16, thereby obtaining a folding or bending type optical waveguide having a mirror housed therein.

In an optical integrated circuit of this type, it is necessary to control very accurately the positional relationship between the optical waveguide and the mirror. Deviation of the mirror position brings about a change in the direction of the propagating lightwave, resulting in failure to guide the lightwave reflected from the mirror to the optical waveguide accurately. It follows that the characteristics of the optical integrated circuit are markedly deteriorated.

It should be noted that the surface of the upper cladding layer 14 is relatively smooth, making it very difficult to detect the position of the optical waveguide on the basis of the surface unevenness. However, where the upper cladding layer 14 is formed of a transparent material such as a silica glass, it is possible to detect the position of the optical waveguide by optically recognizing, for example, the shape of the waveguide core or the position aligning pattern buried in advance in the upper cladding layer 14. In this case, an etching mask, which is used in the step of processing, for example, a mirror, and is formed before the position alignment, is required to be a transparent material. It follows that serious restrictions are required in the manufacturing method and selection of the materials.

where a position aligning pattern is used as it is as a basis of the position alignment in the subsequent processing, it is difficult in general to visually recognize the position aligning pattern depending on the step required for the subsequent processing. In some cases, the visual recognition of the position aligning pattern is rendered impossible. In order to avoid the difficulty, it is made necessary to select a step which does not impair the capability of visually recognizing the position aligning pattern, leading to a serious restriction in the method of manufacturing an optical component.

SUMMARY OF THE INVENTION

An object of the present invention, which has been achieved under the situation described above, is to provide a method of manufacturing an optical component which permits preventing the capability of visually recognizing the position aligning pattern from being impaired.

According to the present invention, there is provided a method of manufacturing an optical component, comprising the steps of:

forming a first position aligning pattern on a surface of a substrate;

forming a second position aligning recess-projection pattern conforming with the first position aligning pattern and a third position aligning recess-projection pattern having a predetermined positional relationship with the second position aligning recess-projection pattern; and applying a predetermined processing with the third position aligning recess-projection pattern used as a reference under a predetermined positional relationship with the first position aligning pattern.

In the method of the present invention, a predetermined processing is carried out with the third position aligning recess-projection pattern used as a reference, with the result that the predetermined processing can be carried out under a predetermined positional relationship with the first position aligning pattern. It follows that, even if it is difficult to visually recognize sufficiently the first position aligning pattern, which is covered with a film, the processing can be carried out under an accurate positional relationship because the third position aligning recess-projection pattern, which can be clearly distinguished, is used as a reference. Naturally, the method of the present invention permits markedly increasing the degree of freedom of the processing, compared with the prior art in which only one position aligning pattern is used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles 0f the invention.

FIG. 3 shows an arrangement of three kinds of photo masks used in forming a folding or bending type optical waveguide in a method according to one embodiment of the present invention; and FIG. 4 shows an arrangement of three kinds of photo masks used in forming an optical phase modulator consisting of a titanium-diffused waveguide using a lithium niobate substrate in a method according to another embodiment of the present invention.

DETAILED DESCRIPTION OF THE PREFERRED EMBODIMENTS

Figure 1:
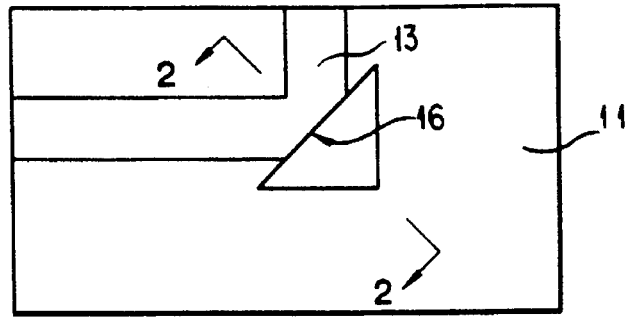
FIG. 1 is a plan view showing a folding or bending type optical waveguide.
Figure 2:
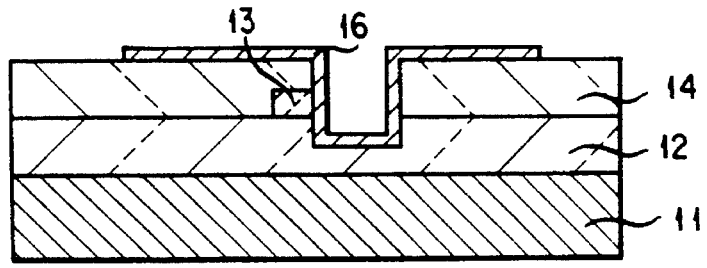
FIG. 2 is a cross sectional view along the line 2—2 shown in FIG. 1.

The method of the present invention comprises the step of forming a first position aligning pattern, followed by the step of simultaneously forming a second position aligning recess-projection pattern conforming with the first position aligning pattern and a third position aligning recess-projection pattern having a predetermined positional relationship with the second position aligning recess-projection pattern.

In the method of the present invention, the first position aligning pattern, the second position aligning recess-projection pattern and the third position aligning recess-projection pattern can be formed by using two photo masks having different mask patterns. In the manufacture of, for example, a folding or bending type optical waveguide housing a mirror, a waveguide pattern and the first position aligning pattern having a predetermined positional relationship with the waveguide pattern are formed on a substrate by using a photo mask having the waveguide pattern and the first position aligning pattern. Then, an upper cladding silica layer is formed over the entire surface, followed by forming the second position aligning recess-projection pattern and the third position aligning recess-projection pattern on the surface of the upper cladding silica layer by using a photo mask having the second position aligning pattern conforming with the first position aligning pattern and the third position aligning pattern having a predetermined positional relationship with the second position aligning pattern. What should be noted is that the third position aligning recess-projection pattern can be used as a reference in the etching step for forming a mirror. It should be noted that the third position aligning recess-projection pattern has a predetermined positional relationship with the first position aligning pattern and the waveguide pattern, through the second position aligning recess-projection pattern, making it possible to form a mirror portion under an accurate positional relationship with the waveguide pattern.

FIG. 3 shows a method according to one embodiment of the present invention. In this embodiment, three kinds of photo masks used for forming a folding or bending type optical waveguide which houses a mirror, i.e., photo masks 21, 22 and 23, are vertically stacked in this order. It should be noted that the photo mask 21 has an optical waveguide pattern 24 and a first position aligning pattern 25a. Likewise, the photo mask 22 has a second position aligning pattern 25b and a third position aligning pattern 26a. The photo mask 23 has a mirror pattern 27 and a fourth position aligning pattern 26b.

The fording or bending type optical waveguide housing a mirror was actually formed by using these three kinds of the photo masks, i.e., photo masks 21, 22 and 23, as described below. In the first step, a lower cladding layer consisting of silica glass was formed in a thickness of 20 µm on a silicon substrate, followed by forming a core layer consisting of a germanium-added silica glass in a thickness of 8 µm on the lower cladding layer, as in the prior art. The difference in refractive index between the upper cladding layer and the core layer was 0.25%. Then, an undesired portion of the core layer was removed as in the prior art by using a photolithography method with a reactive ion etching method so as to form a channeled core and a first position aligning recess-projection pattern. Used in this step was the photo mask 21 having the optical waveguide pattern 24 and the first position aligning pattern 25a. After formation of the channeled core and the first position aligning recess-projection pattern, an upper cladding layer consisting of silica glass was formed in a thickness of 20 µm as in the formation of the lower cladding layer. In this step, the first position aligning recess-projection pattern was buried in the upper cladding layer, with the result that a recess-projection pattern corresponding to the first position aligning recess-projection pattern was eliminated from the surface of the upper cladding layer.

In the next step, the second position aligning recess-projection pattern and the third position aligning recess-projection pattern each consisting of fine recess-projection pattern having a depth of about 0.1 µm were formed on the substrate surface by employing a photolithography method with a reactive ion method. In forming these second and third position aligning patterns, used was the photo mask 22 having the second position aligning pattern 25b conforming with the first position aligning recess-projection pattern and the third position aligning pattern 26a having a predetermined positional relationship with the second position aligning pattern 25b. In this step, it was difficult to recognize the first position aligning recess-projection pattern as a recess-projection pattern formed on the substrate surface. However, the first position aligning recess-projection pattern was visually recognized clearly through a transparent photo resist in the step of forming a fine recess-projection pattern by the photolithography method because of the difference in the refractive index within the substrate. It should be noted that it suffices for the etching depth to be very small in the formation of the fine recess-projection pattern, with the result that a photo resist can be used easily as an etching mask.

Then, a silicon film was formed in a thickness of 1 µm over the entire surface by means of a sputtering technique, followed by selectively removing the silicon film in regions corresponding to the mirror pattern 27, etc. by means of a photo lithography method with a reactive ion etching method. Further, a mirror portion was formed in a depth of about 35 µm by the reactive ion etching method using the patterned silicon film as an etching mask. In the step of patterning the silicon film, it was quite impossible to visually recognize the first position aligning pattern because the particular pattern was covered with the opaque silicon film.

However, the third position aligning recess-projection pattern having a predetermined positional relationship with the first position aligning recess-projection pattern was clearly recognized visually as a recess-projection pattern on the film surface even after formation of the silicon film. As a result, it was possible to carry out the position aligning process without difficulty.

In the embodiment described above, the positional relationship between the waveguide pattern and the mirror portion was achieved with such a high accuracy as about 0.5 µm.

FIG. 4 shows another embodiment of the present invention. In this embodiment, three kinds of photo masks, i.e., photo masks 31, 32 and 33, are vertically stacked one upon the other used for forming an optical phase modulator consisting of a titanium-diffused waveguide using a lithium niobate substrate. In this embodiment, the photo mask 31 has an optical waveguide pattern 34 and a first position aligning pattern 35a. Likewise, the photo mask 32 has a second position aligning pattern 35b and a third position aligning pattern 36a. The photo mask 33 has electrode patterns 37 and a fourth position aligning pattern 36b.

In the optical phase modulator of this type, it is very important to achieve an accurate positional relationship between the waveguide and the electrodes. It should be noted, however, that each of the waveguide and the other portion is transparent in the titanium-diffused waveguide, though the waveguide is somewhat upheaved relative to the other portion on the lithium niobate substrate, with the result that, if an opaque film is formed thereon, it is impossible to recognize the pattern of the titanium-diffused waveguide. It follows that a serious difficulty is brought about in the subsequent step of achieving a satisfactory positional relationship between the waveguide and the electrodes.

An optical phase modulator was actually formed by using these three kinds of photo masks 31, 32 and 33. In the first step, a titanium pattern and a first position aligning pattern each having a thickness of about 65 nm were formed on a Z-cut lithium niobate substrate by a lift-off method using the photo mask 31 having a waveguide pattern 34 and a first position aligning pattern 35a. Then, a heat treatment was applied at 1035° C. for about 10 hours under a wet oxygen atmosphere for diffusing titanium. As a result, all the titanium on the substrate surface was diffused into the substrate so as to form a titanium-diffused waveguide core and a position aligning pattern each having a refractive index somewhat larger than that in the peripheral portion below the titanium pattern. These waveguide core, etc., which were somewhat upheaved compared with the peripheral portion, were found to be substantially flat. Further, a residual titanium was not found on the substrate surface.

In the next step, a second position aligning recess-projection pattern and a third position aligning recess-projection pattern each consisting of a fine recess-projection pattern having a depth of about 0.1 µm were formed by employing a photolithography method with a reactive ion etching method. In this step of forming the second and third recess-projection position aligning patterns, the photo mask 32 having a second position aligning pattern 35b conforming with the first position aligning pattern and a third position aligning pattern 36a having a predetermined positional relationship with the second position aligning pattern was used.

After formation of the second and third position aligning recess-projection patterns, an electrode film consisting mainly of gold was formed in a thickness of about 0.1 µm by means of, for example, a vacuum evaporation method. In this step, it was quite impossible to visually recognize the first position aligning pattern because the first position aligning pattern was covered with the electrode film consisting of the opaque gold. However, it was possible to visually distinguish the third position aligning recess-projection pattern having a predetermined positional relationship with the first position aligning pattern.

Further, an undesired portion of the electrode film was removed by means of a reactive ion etching method. In this step, the photo mask 33 having a fourth position aligning pattern 36b conforming with the third position aligning recess-projection pattern and an electrode pattern 37 having a predetermined positional relationship with the fourth position aligning pattern 36b was used. In this step, the photo mask 33 was positioned accurately as desired by aligning the fourth position aligning pattern 36b with the third position aligning recess-projection pattern.

The presence of the third position aligning recess-projection pattern was found to make it possible to achieve a satisfactory positional relationship between the waveguide pattern and the electrode patterns with such a high accuracy as 0.5 µm or less in the second embodiment, too.

As described above in detail, the method of the present invention comprises the step of forming a first position aligning pattern, followed by the step of simultaneously forming a second position aligning recess-projection pattern conforming with the first position aligning pattern and a third position aligning recess-projection pattern having a predetermined positional relationship with the second position aligning recess-projection pattern. In the present invention, a predetermined processing is applied with the third position aligning recess-projection pattern as a reference, with the result that the processing can be performed with an accurate positional relationship even in the case where the first position aligning pattern is covered with an opaque film. It follows that the method of the present invention permits markedly increasing the degree of freedom of the processing, compared with the prior art in which only one position aligning pattern is used.

In the embodiment shown in FIG. 3, two position aligning patterns 25b and 26a are formed in the photo mask 22. Likewise, two position aligning patterns 35b and 36a are formed in the photo mask 32 in the embodiment shown in FIG. 4. It should be noted in this connection that a substrate and a photo mask are required to have different patterns of their exclusive shapes in the case of using, particularly, an automated mask alignment apparatus, making it necessary in general to allow the photo mask 22 or 32 to have two position aligning patterns as described above. However, in the case where the same pattern can be commonly used on each of the substrate and the photo mask, it is possible for the photo mask 22 or 32 to have a single position aligning pattern.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of positioning elements in the manufacture of an optical integrated circuit having a waveguide comprising the steps of:

forming a first mark having a first pattern on a surface of a substrate;

forming, on a layer formed during the manufacture of the optical integrated circuit, a second mark having a second pattern that conforms to said first pattern, said second mark aligned with said first mark, and a third mark having a third pattern; said second mark and said third mark having a depth in said layer and said third mark having a predetermined positional relationship with said second mark;

applying a predetermined process for manufacturing the optical integrated circuit using said third mark as a reference for the position of said first mark.

2. The method according to claim 1, further comprising the step of forming an opaque film before application of said predetermined process such that the second mark and the third mark are covered with said opaque film.

3. The method according to claim 1, wherein said substrate is a silicon substrate, said layer is a silica glass layer deposited on the first mark, and the second mark and the third mark are formed on the surface of said silica glass layer.

4. The method according to claim 1, wherein said first mark, said second mark and said third mark are formed by using two photo masks having corresponding patterns.

5. The method according to claim 1, wherein said waveguide has a mirror portion for reflecting light in the waveguide.

6. The method according to claim 1, wherein said integrated circuit comprise an optical phase modulator said substrate is a lithium niobate substrate and a said waveguide is titanium-diffused waveguide.

7. A method according to claim 1, wherein said second mark and said third mark are recesses in said layer.

8. A method according to claim 1, wherein said first mark is a portion of the substrate having a refractive index different from the substrate surrounding said portion.

* * * * *